United States Patent
Miyake

(10) Patent No.: US 9,453,445 B2
(45) Date of Patent: Sep. 27, 2016

(54) EXHAUST PURIFICATION SYSTEM OF INTERNAL COMBUSTION ENGINE

(71) Applicant: Teruhiko Miyake, Shizuoka (JP)

(72) Inventor: Teruhiko Miyake, Shizuoka (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/764,110

(22) PCT Filed: Feb. 25, 2013

(86) PCT No.: PCT/JP2013/054781
§ 371 (c)(1),
(2) Date: Jul. 28, 2015

(87) PCT Pub. No.: WO2014/128969
PCT Pub. Date: Aug. 28, 2014

(65) Prior Publication Data
US 2016/0010527 A1 Jan. 14, 2016

(51) Int. Cl.
*F01N 3/20* (2006.01)
*F01N 3/08* (2006.01)
*F01N 9/00* (2006.01)
(Continued)

(52) U.S. Cl.
CPC ............... *F01N 3/206* (2013.01); *F01N 3/085* (2013.01); *F01N 3/0814* (2013.01); *F01N 3/0821* (2013.01); *F01N 3/0842* (2013.01); *F01N 3/0871* (2013.01); *F01N 3/0885* (2013.01); *F01N 3/2033* (2013.01); *F01N 9/00* (2013.01); *F02D 41/028* (2013.01); *F02D 41/0235* (2013.01); *F02D 41/1446* (2013.01); *F02D 41/1475* (2013.01); *F01N 2570/14* (2013.01); *F01N 2610/03* (2013.01); *F01N 2610/146* (2013.01); *F01N 2900/1612* (2013.01);
(Continued)

(58) Field of Classification Search
CPC .... F01N 3/0842; F01N 3/085; F01N 3/0871; F01N 3/0885; F01N 3/2033; F01N 2610/03; F01N 2900/1612; F01N 3/0814; F02D 41/028
See application file for complete search history.

(56) References Cited

U.S. PATENT DOCUMENTS

2007/0137183 A1 6/2007 Kawamura et al.
2012/0131908 A1 5/2012 Bisaiji et al.
(Continued)

FOREIGN PATENT DOCUMENTS

EP 2541009 A1 1/2013
JP 2007-170218 A1 7/2007
(Continued)

*Primary Examiner* — Jonathan Matthias
(74) *Attorney, Agent, or Firm* — Finnegan, Henderson, Farabow, Garrett & Dunner, LLP

(57) ABSTRACT

An internal combustion is configured such that a hydrocarbon supply valve (15) and an exhaust gas purification catalyst (13) are arranged in an engine exhaust gas passage and such that $NO_x$ contained within exhaust gas is purified by spraying hydrocarbon from the hydrocarbon supply valve (15) at predetermined intervals. When $SO_x$ is to be released from the exhaust gas purification catalyst (13), the air-fuel ratio of exhaust gas which flows into the exhaust gas purification catalyst (13) is enriched by generating, within a cylinder, combustion gas having a rich air-fuel ratio, and after that the air-fuel ratio of exhaust gas which flows into the exhaust gas purification catalyst (13) is enriched by supplying hydrocarbon from the hydrocarbon supply valve (15).

6 Claims, 16 Drawing Sheets

(51) Int. Cl.
  *F02D 41/02* (2006.01)
  *F02D 41/14* (2006.01)
(52) U.S. Cl.
  CPC ............... *F02D2200/0804* (2013.01); *F02D 2200/0806* (2013.01); *Y02T 10/26* (2013.01); *Y02T 10/47* (2013.01)

(56) References Cited

U.S. PATENT DOCUMENTS

2012/0144807 A1* 6/2012 Sobue .................. F01N 3/0814
                                                                60/286
2013/0000284 A1   1/2013 Bisaiji et al.
2013/0291522 A1* 11/2013 Bisaiji .................. F01N 3/0885
                                                                60/286

FOREIGN PATENT DOCUMENTS

| JP | 2010-019092 A1 | 1/2010 | |
| JP | 2010-163979 A1 | 7/2010 | |
| JP | 4893876 B | 3/2012 | |
| WO | WO 2011/118044 A1 | 9/2011 | |
| WO | WO 2012098688 A1 * | 7/2012 | ........... F01N 3/0885 |

* cited by examiner

FIG. 1
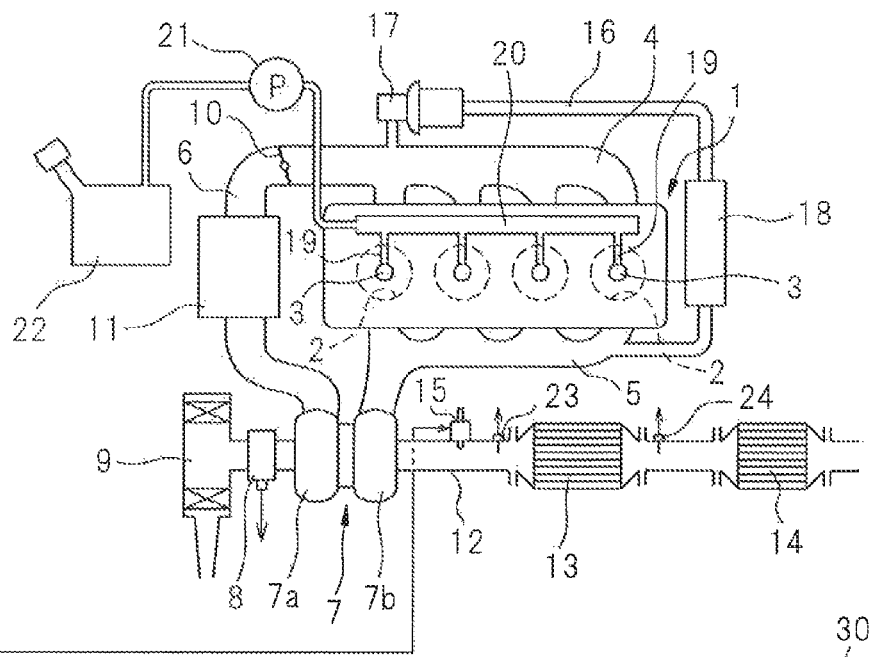
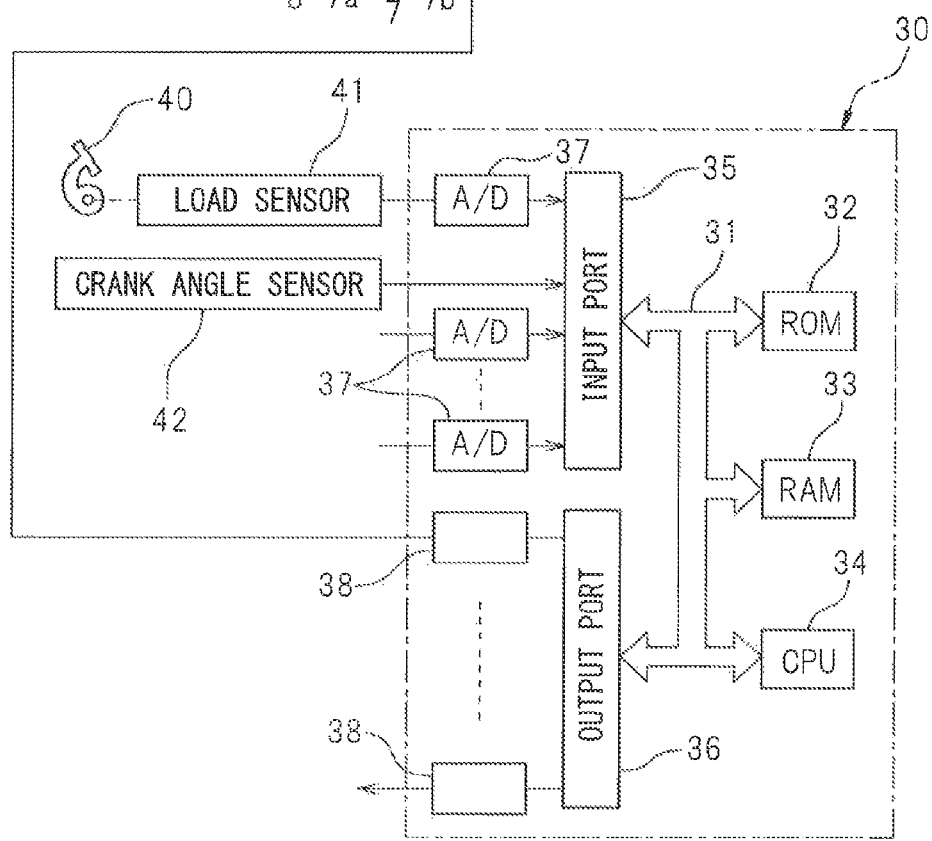

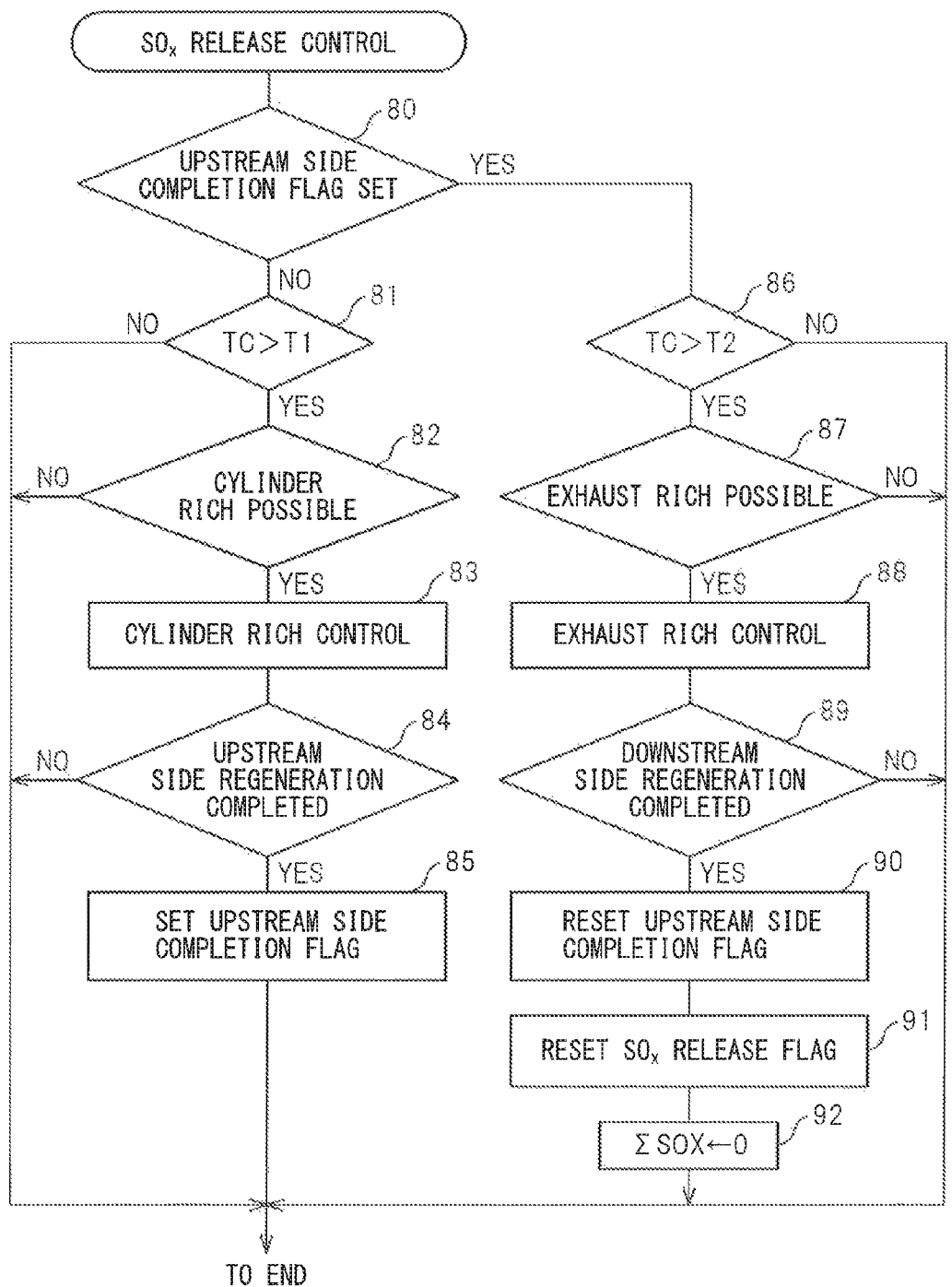

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an exhaust purification system of an internal combustion engine which arranges an exhaust purification catalyst in an engine exhaust passage and which arranges a hydrocarbon feed valve upstream of the exhaust purification catalyst inside the engine exhaust passage, wherein the exhaust purification catalyst has the property of reducing the $NO_x$ which is contained in the exhaust gas if making the concentration of hydrocarbons which flow into the exhaust purification catalyst vibrate within a predetermined range of amplitude and within a predetermined range of period and has the property of being increased in storage amount of the $NO_x$ contained in the exhaust gas if making a vibration period of the hydrocarbon concentration longer than the predetermined range and wherein a first $NO_x$ removal method which removes $NO_x$ contained in the exhaust gas by injecting hydrocarbons from the hydrocarbon feed valve at a period within the predetermined range and a second $NO_x$ removal method which makes the air-fuel ratio of the exhaust gas flowing into the exhaust purification catalyst rich to release the stored $NO_x$ from the exhaust purification catalyst when the amount of $NO_x$ stored in the exhaust purification catalyst exceeds a predetermined allowable value are selectively used (for example, see PTL 1).

In this internal combustion engine, in case where the $NO_x$ removal action by the second $NO_x$ removal method is being performed, when $NO_x$ should be released from the exhaust purification catalyst, the air-fuel ratio of the exhaust gas flowing into the exhaust purification catalyst is made rich. At this time, as a rich control for making the air-fuel ratio of the exhaust gas flowing into the exhaust purification catalyst rich, a cylinder rich control which generates a rich air-fuel ratio combustion gas in the cylinder is used. Furthermore, in this internal combustion engine, when $SO_x$ should be released from the exhaust purification catalyst, the air-fuel ratio of the exhaust gas flowing into the exhaust purification catalyst is made rich. However, in this internal combustion engine, at this time, it is unclear if an exhaust rich control which feeds hydrocarbons from the hydrocarbon feed valve to make the air-fuel ratio of the exhaust gas rich is being used or the above-mentioned cylinder rich control is being used.

CITATION LIST

Patent Literature

PTL 1: WO2011/118044A1

SUMMARY OF INVENTION

Technical Problem

Now then, when releasing $SO_x$ from the exhaust purification catalyst, it is necessary to make the air-fuel ratio of the exhaust gas flowing into the exhaust purification catalyst intermittently rich so as to raise the temperature of the exhaust purification catalyst to the $SO_x$ release temperature. On the other hand, the first $NO_x$ removal method can obtain a high $NO_x$ purification rate even at the time of engine high load operation where the temperature of the exhaust purification catalyst becomes high, so at the time of engine high load operation, an $NO_x$ removal action by the first $NO_x$ removal method is performed. In this regard, at the time of engine high load operation, smoke is easily generated. Therefore, if the $NO_x$ removal action by the first $NO_x$ removal method is continuously performed, deposits comprised of carbonized particulate etc. gradually build up at the upstream side end face of the exhaust purification catalyst. In this regard, when deposits build up at the upstream side end face of the exhaust purification catalyst, if injecting hydrocarbons from the hydrocarbon feed valve to make the air-fuel ratio of the exhaust gas flowing into the exhaust purification catalyst rich to raise the temperature of the exhaust purification catalyst to the $SO_x$ release temperature, the injected hydrocarbons stick to the deposits and can no longer be burned well. As a result, the problem arises that the temperature of the exhaust purification catalyst cannot be made to rise to the $SO_x$ release temperature and therefore $SO_x$ cannot be released from the exhaust purification catalyst well.

An object of the present invention is to provide an exhaust purification system of an internal combustion engine which is designed so that even if the $NO_x$ removal action by the first $NO_x$ removal method has been continuously performed, the temperature of the exhaust purification catalyst can be made to rise well.

Solution to Problem

According to the present invention, there is provided an exhaust purification system of an internal combustion engine in which an exhaust purification catalyst is arranged in an engine exhaust passage, a hydrocarbon feed valve is arranged in the engine exhaust passage upstream of the exhaust purification catalyst, precious metal catalysts are carried on exhaust gas flow surfaces of the exhaust purification catalyst, basic exhaust gas flow surface parts are formed around the precious metal catalysts, the exhaust purification catalyst has a property of reducing $NO_x$ which is contained in the exhaust gas if making a concentration of hydrocarbons flowing into the exhaust purification catalyst vibrate within a predetermined range of amplitude and within a predetermined range of period and has a property of being increased in storage amount of $NO_x$ which is contained in the exhaust gas if making a vibration period of the hydrocarbon concentration longer than the predetermined range, and $NO_x$ contained in the exhaust gas is removed by injecting hydrocarbons from the hydrocarbon feed valve within said predetermined range of period, wherein as rich control for making an air-fuel ratio of an exhaust gas flowing into the exhaust purification catalyst rich, cylinder rich control for generating a rich air-fuel ratio combustion gas in a cylinder and exhaust rich control for feeding hydrocarbons from the hydrocarbon feed valve to make the air-fuel ratio of the exhaust gas rich are selectively used, when $SO_x$ should be released from the exhaust purification catalyst, first, the cylinder rich control is performed to make the air-fuel ratio of the exhaust gas flowing into the exhaust purification catalyst rich, and next the exhaust rich control is performed to make the air-fuel ratio of the exhaust gas flowing into the exhaust purification catalyst rich.

Advantageous Effects of Invention

If the cylinder rich control is performed, light hydrocarbons are exhausted from the engine. If the light hydrocarbons are sent into the exhaust purification catalyst, the deposits which build up on the upstream side end face of the exhaust purification catalyst are made to burn well by the light hydrocarbons. In the present invention, as explained above, when $SO_x$ should be released from the exhaust purification catalyst, first, the cylinder rich control is performed to make the air-fuel ratio of the exhaust gas flowing into the exhaust purification catalyst rich. Therefore, at this time, the deposits are made to burn well. Due to this, the temperature of the exhaust purification catalyst can be made to rise well.

BRIEF DESCRIPTION OF DRAWINGS

FIG. 1 is an overall view of a compression ignition type internal combustion engine.

FIG. 21 is a flow chart for performing an $SO_x$ release control.

DESCRIPTION OF EMBODIMENTS

Figure 2:
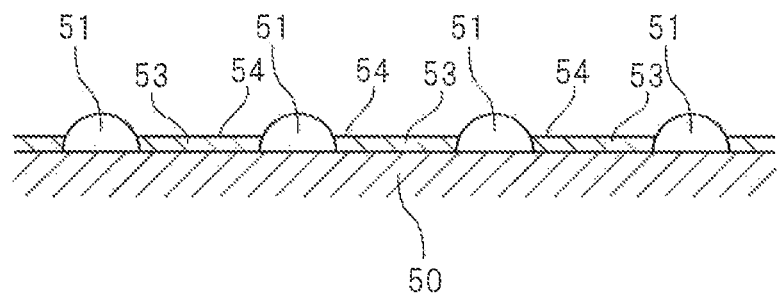
FIG. 2 is a view which schematically shows the surface part of a catalyst carrier.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12 to an inlet of an exhaust purification catalyst 13. In an embodiment of the present invention, this exhaust purification catalyst 13 is comprised of an $NO_x$ storage catalyst 13. An outlet of the exhaust purification catalyst 13 is connected to an inlet of a particulate filter 14 and, upstream of the exhaust purification catalyst 13 inside the exhaust pipe 12, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On she other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Upstream of the exhaust purification catalyst 13, a temperature sensor 23 is arranged for detecting the temperature of the exhaust gas flowing into the exhaust purification catalyst 13. Downstream of the exhaust purification catalyst 13, a temperature sensor 24 is arranged for detecting the temperature of the exhaust gas flowing out from the exhaust purification catalyst 13. The output signals of these temperature sensors 23, 24 and intake air amount detector 8 are input through respectively corresponding AD converters 33 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_x$. In this case, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 cars be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
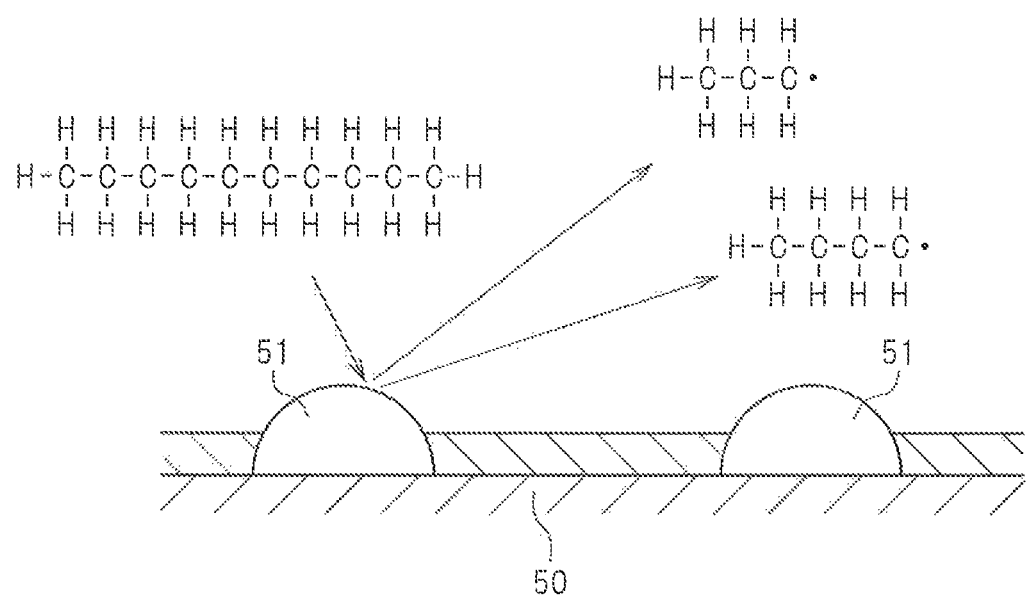
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
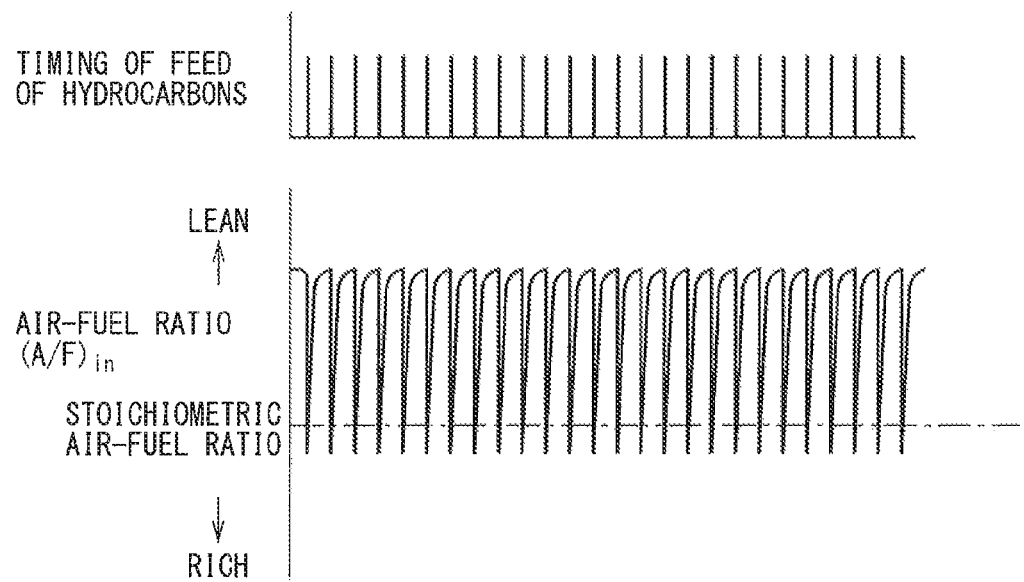
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the change in the air-fuel ratio (A/F) in depends on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
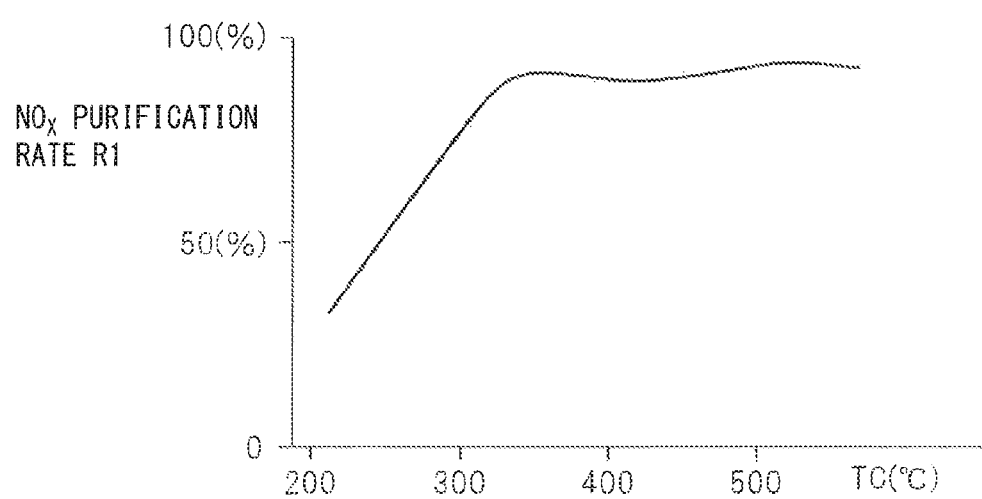
FIG. 5 is a view which shows an $NO_x$ purification rate R1.

FIG. 5 shows the $NO_x$ purification rate R1 by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically mate the air-fuel ratio (A/F) in of the exhaust gas flowing to the exhaust purification catalyst 13 rich. In this regard, as a result of a research relating to $NO_x$ purification for a long time, it is learned that if making the concentration of hydrocarbons which flow into the exhaust purification catalyst 13 vibrate by within a predetermined range of amplitude and within a predetermined range of period, as shown in FIG. 5, an extremely high $NO_x$ purification rate R1 is obtained even in a 350° C. or higher high temperature region.

Figure 6A:
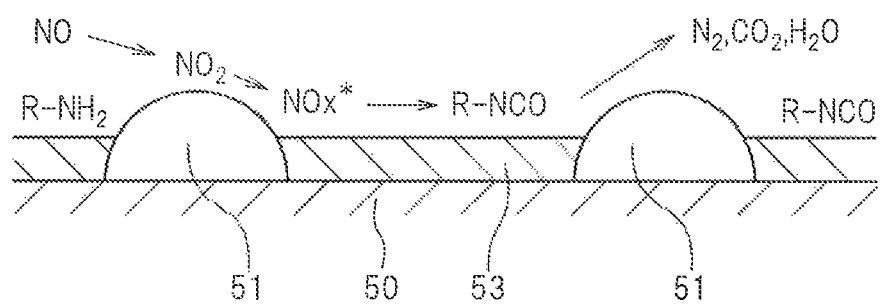
FIGS. 6A and 6B are views for explaining an oxidation reduction reaction in an exhaust purification catalyst.
Figure 6B:
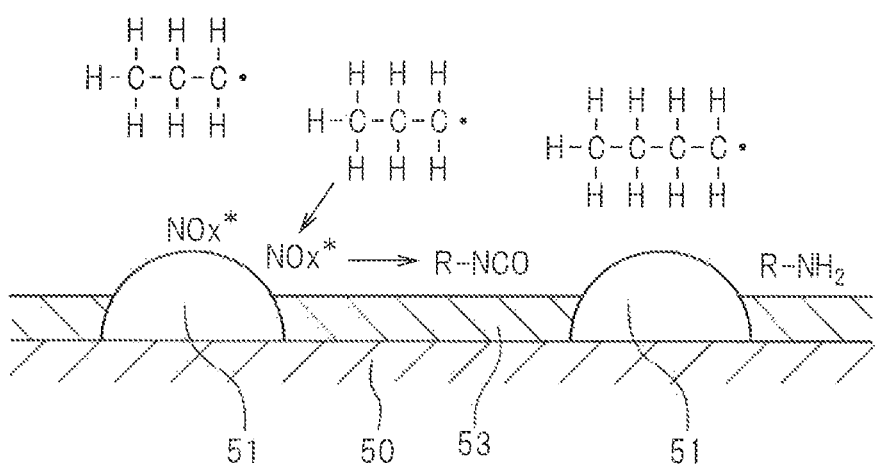

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_x$ purification rate R1. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration, of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of she NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_x^*$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_x^*$ becomes higher. In this regard, if, after the active $NO_x^*$ is produced, the state of a nigh oxygen concentration around the active $NO_x^*$ continues for a constant time or more, the active $NO_x^*$ is oxidized and is absorbed in the form of nitrate ions $NO_3^-$ inside the basic layer 53. However, if, before this constant time elapses, the hydrocarbon concentration around the active $NO_x^*$ becomes higher, as shown in FIG. 6B, the active $NO_x^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrite compound R—CN can only survive for an instant in this state, so immediately becomes an isocyanate compound R—NCO. This isocyanate compound R—NCO becomes an amine compound R—NH$_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—NH$_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the NO$_x$ in the exhaust gas, react with the active NO$_x$*, react with the surrounding oxygen, or break down on their own. Due to this, the reducing intermediates R—NCO and R—NH$_2$ are converted to N$_2$, CO$_2$, and H$_2$O as shown in FIG. 6A, therefore the NO$_x$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the NO$_x$ in the exhaust gas or the active NO$_x$* or oxygen or break down on their own whereby the NO$_x$ is removed. That is, in order for the exhaust purification catalyst 13 to remove the NO$_x$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the NO$_x$ in the exhaust gas or the active NO$_x$* or oxygen or break down on their own. That is, it is necessary to make the concentration of hydrocarbons which flow into the exhaust purification catalyst 13 vibrate by within a predetermined range of amplitude. Note chat, in this case, it is necessary to hold these reducing intermediates on the basic layer 53, that is, the basic exhaust gas flow surface parts 54, until the produced reducing intermediates R—NCO and R—NH$_2$ react with the NO$_x$ in the exhaust gas or the active NO$_x$* or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active NO$_x$* is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the NO$_x$ contained in the exhaust gas and the reformed hydrocarbons and produce the reducing intermediates R—NCO and R—NH$_2$ containing nitrogen and hydrocarbons, the precious metal catalysts 51 are carried on the exhaust gas flow surfaces of the exhaust purification catalyst 13. To hold the produced reducing intermediates R—NCO and R—NH$_2$ inside the exhaust purification catalyst 13, the basic exhaust gas flow surface parts 54 are formed around the precious metal catalysts 51. The reducing intermediates R—NCO and R—NH$_2$ which are held on the basic exhaust gas flow surface parts 54 are converted to N$_2$, CO$_2$, and H$_2$O. The vibration period of the hydrocarbon concentration is made the vibration period required for continuation of the production of the reducing intermediates R—NCO and R—NH$_2$. Incidentally, in the example shown in FIG. 4, the injection interval is made 3 seconds.

Figure 7A:
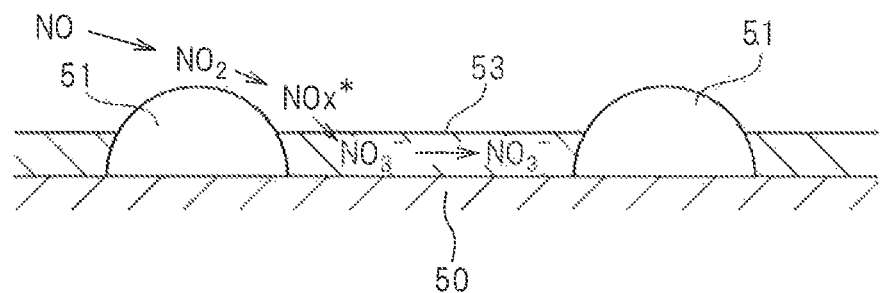
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—NH$_2$ disappear from the surface of the basic layer 53. At this time, the active NO$_x$* which is produced on the platinum Pt 53, as shown in FIG. 7A, diffuses in the basic layer 53 in the form of nitrate ions NO$_3^-$ and becomes nitrates. That is, at this time, the NO$_x$ in the exhaust gas is absorbed in the form of nitrates inside of the basic layer 53.

Figure 7B:
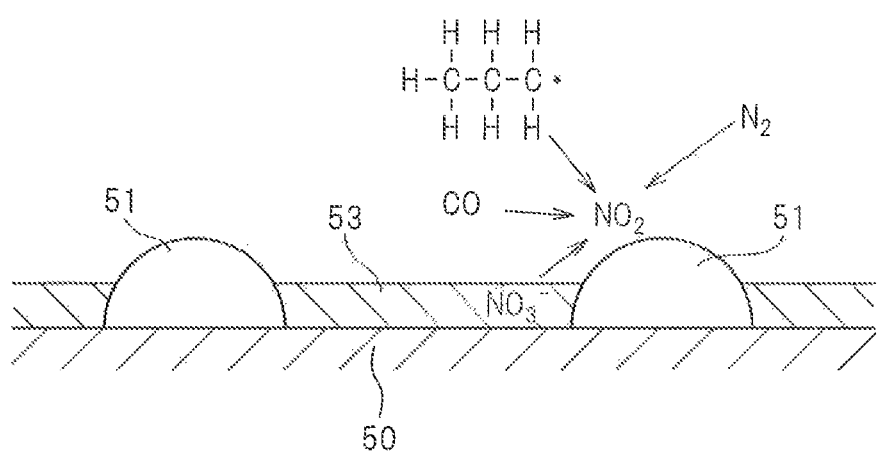

On the other hand, FIG. 7B shows the case where the air-fuel ratio of the exhaust gas which flows into the exhaust purification catalyst 13 is made the stoichiometric air-fuel ratio or rich when the NO$_x$ is absorbed in the form of nitrates inside of the basic layer 53. In this case, the oxygen concentration in the exhaust gas falls, so the reaction proceeds in the opposite direction (NO$_3^-$→NO$_2$), and consequently the nitrates absorbed in the basic layer 53 successively become nitrate ions NO$_3^-$ and, as shown in FIG. 7B, are released from the basic layer 53 in the form of NO$_2$. Next, the released NO$_2$ is reduced by the hydrocarbons HC and CO contained in the exhaust gas.

Figure 8:
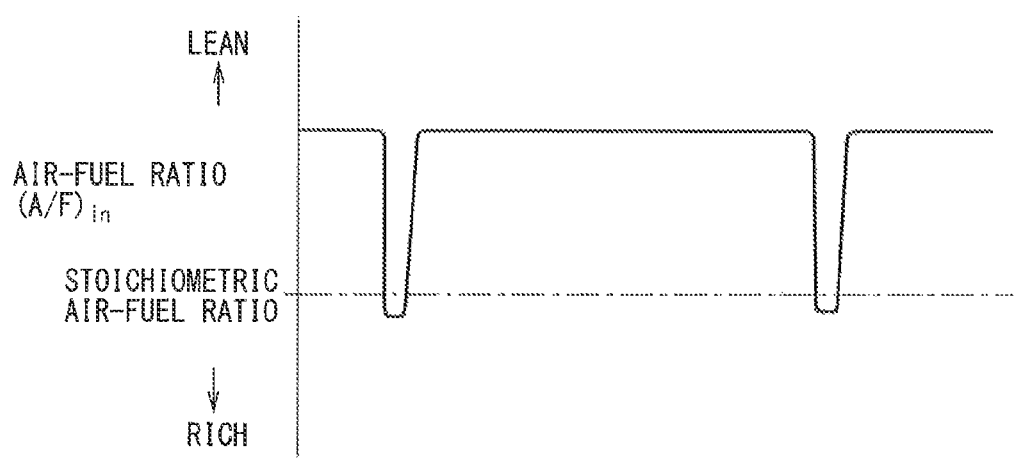
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the NO$_x$ absorption ability of the basic layer 53 becomes saturated. Note that, in the example shown in FIG. 8, the time interval of this rich control is 1 minute or sore. In this case, the NO$_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing NO$_x$.

Note that, at this time, sometimes the basic layer 53 temporarily adsorbs the NO$_x$. Therefore, if using term of "storage" as a term including both "absorption" and "adsorption", at this time, the basic layer 53 performs the role of an NO$_x$ storage agent for temporarily storing the NO$_x$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an NO$_x$ storage catalyst which stores the NO$_x$ when the air-fuel ratio of the exhaust gas is lean and releases the stored NO$_x$ when the oxygen concentration in the exhaust gas falls.

Figure 9:
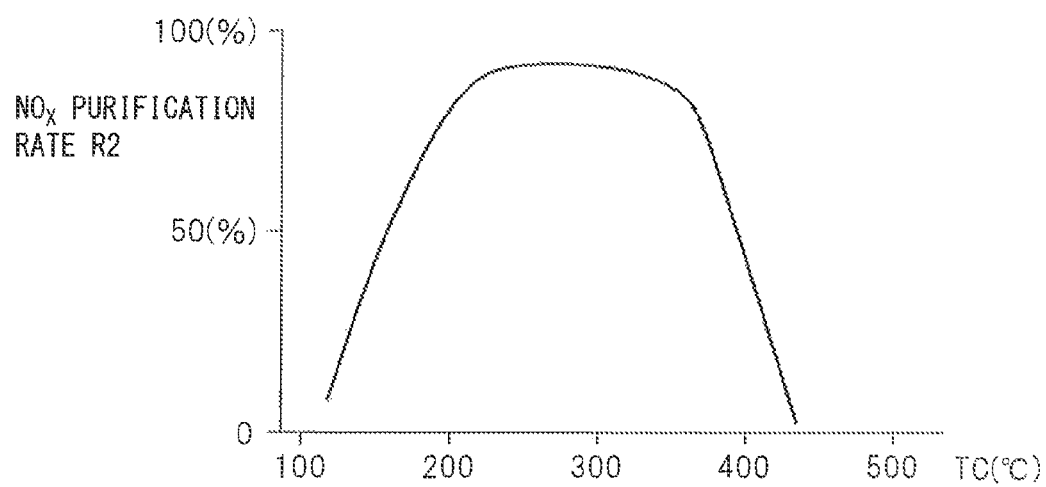
FIG. 9 is a view which shows an $NO_x$ purification rate R2.

FIG. 9 shows the NO$_x$ purification rate R2 when making the exhaust purification catalyst 13 function as an NO$_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 250° C. to 300° C., an extremely high $NO_x$ purification rate is obtained, but when the catalyst temperature TC becomes a 350° C. or higher high temperature, the $NO_x$ purification rate R2 falls.

In this way, when the catalyst temperature TC becomes 350° C. or more, the $NO_x$ purification rate R2 falls because if the catalyst temperature TC becomes 350° C. or more, $NO_x$ is less easily stored and the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate R2. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate R1 is obtained.

In the embodiment according to the present invention, to be able to purify $NO_x$ by using this new $NO_x$ purification method, a hydrocarbon feed valve 15 for feeding hydrocarbons is arranged in the engine exhaust passage, an exhaust purification catalyst 13 is arranged in the engine exhaust passage downstream of the hydrocarbon feed, valve 15, precious metal catalysts 51 are carried on the exhaust gas flow surfaces of the exhaust purification catalyst 13, basic exhaust gas flow surface parts 54 are formed around the precious metal catalysts 51, the exhaust purification catalyst 13 has the property of reducing the $NO_x$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_x$ which is contained in exhaust gas if the vibration period of the hydrocarbon concentration is made longer than this predetermined range, and, at the time of engine operation, the hydrocarbons are injected from the hydrocarbon feed valve 15 within the predetermined range of period to thereby reduce the $NO_x$ which is contained in the exhaust gas in the exhaust purification catalyst 13.

Figure 10:
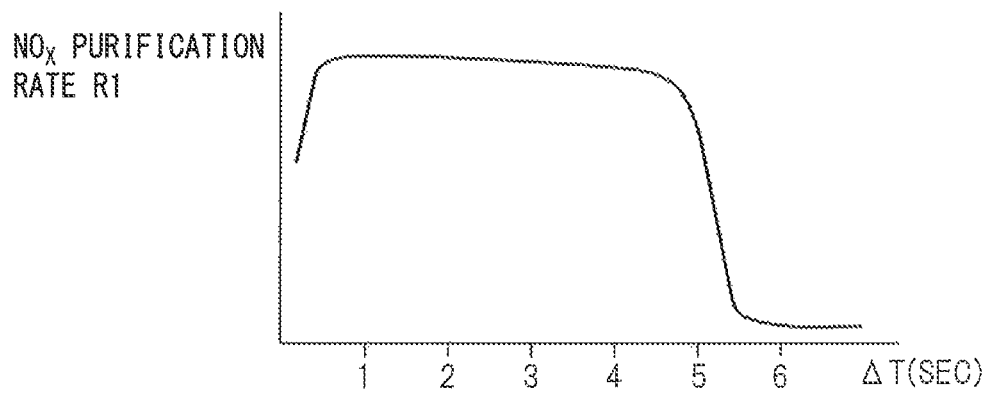
FIG. 10 is a view which shows a relationship between a vibration period ΔT of hydrocarbon concentration and an $NO_x$ purification rate R1.

That is, the $NO_x$ purification method which is shown from FIG. 4 to FIGS. 6A and 6B can be said to be a new $NO_x$ purification method designed to remove $NO_x$ without forming so much nitrates in the case of using an exhaust purification catalyst which carries precious metal catalysts and forms a basic layer which can absorb $NO_x$. In actuality, when using this new $NO_x$ purification method, the nitrates which are detected from the basic layer 53 become smaller in amount compared with the case where making the exhaust purification catalyst 13 function as an $NO_x$ storage catalyst. Note that, this new $NO_x$ purification method will be referred to below as the "first $NO_x$ removal method", Now, as mentioned before, if the injection period $\Delta T$ of the hydrocarbons from the hydrocarbon feed valve 15 becomes longer, the time period in which the oxygen concentration around the active $NO_x^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_x^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_x$ purification rate R1 falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 10, if the injection period $\Delta T$ of the hydrocarbons becomes about 0.3 second or less, the $NO_x$ purification rate R1 falls. Therefore, in the embodiment according to the present invention, the injection period of the hydrocarbons is made from 0.3 second to 5 seconds.

Figure 11A:
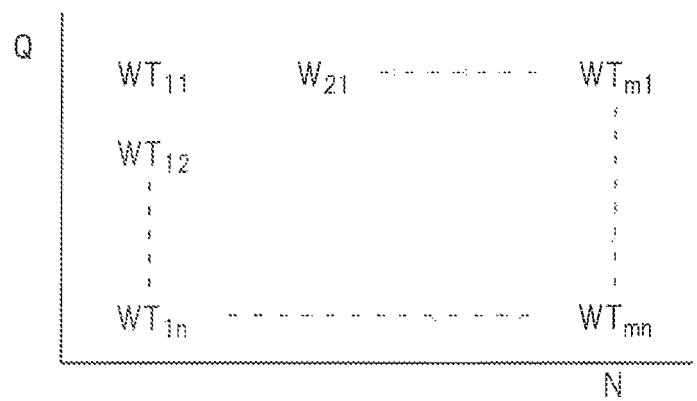
FIGS. 11A and 11B are views which show maps of the injection amount of hydrocarbons etc.
Figure 11B:
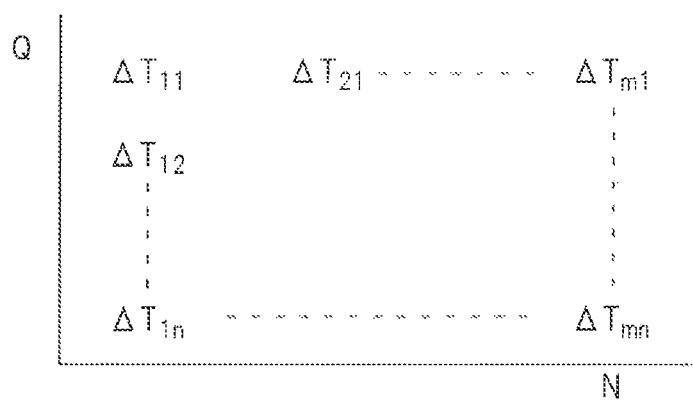

Now, in the embodiment according to the present invention, when the $NO_x$ purification action by the first $NO_x$ removal method is performed, by controlling the injection amount and injection timing of hydrocarbons from the hydrocarbon feed valve 15, the air-fuel ratio (A/F) in of the exhaust gas flowing into the exhaust purification catalyst 13 and the injection period $\Delta T$ of the hydrocarbons are controlled so as to become the optimal values for the engine operating state. In this case, in the embodiment according to the present invention, the optimum hydrocarbon injection amount WT when the $NO_x$ purification action by the first $NO_x$ removal method is performed is stored as a function of the injection amount Q from fuel injectors 3 and the engine speed N in the form of a map such as shown in FIG. 11A in advance in the ROM 32. Further, the optimum injection period $\Delta T$ of the hydrocarbons at this time is also stored as a function of the injection amount Q from the fuel injectors 3 and the engine speed N in the form of a map such as shown in FIG. 11B in advance in the ROM 32.

Next, referring to FIG. 12 to FIG. 15, an $NO_x$ purification method when making the exhaust purification catalyst 13 function as an $NO_x$ storage catalyst will be explained specifically. The $NO_x$ purification method in the case of making the exhaust purification catalyst 13 function as an $NO_x$ storage catalyst in this way will be referred to below as the "second $NO_x$ removal method".

Figure 12:
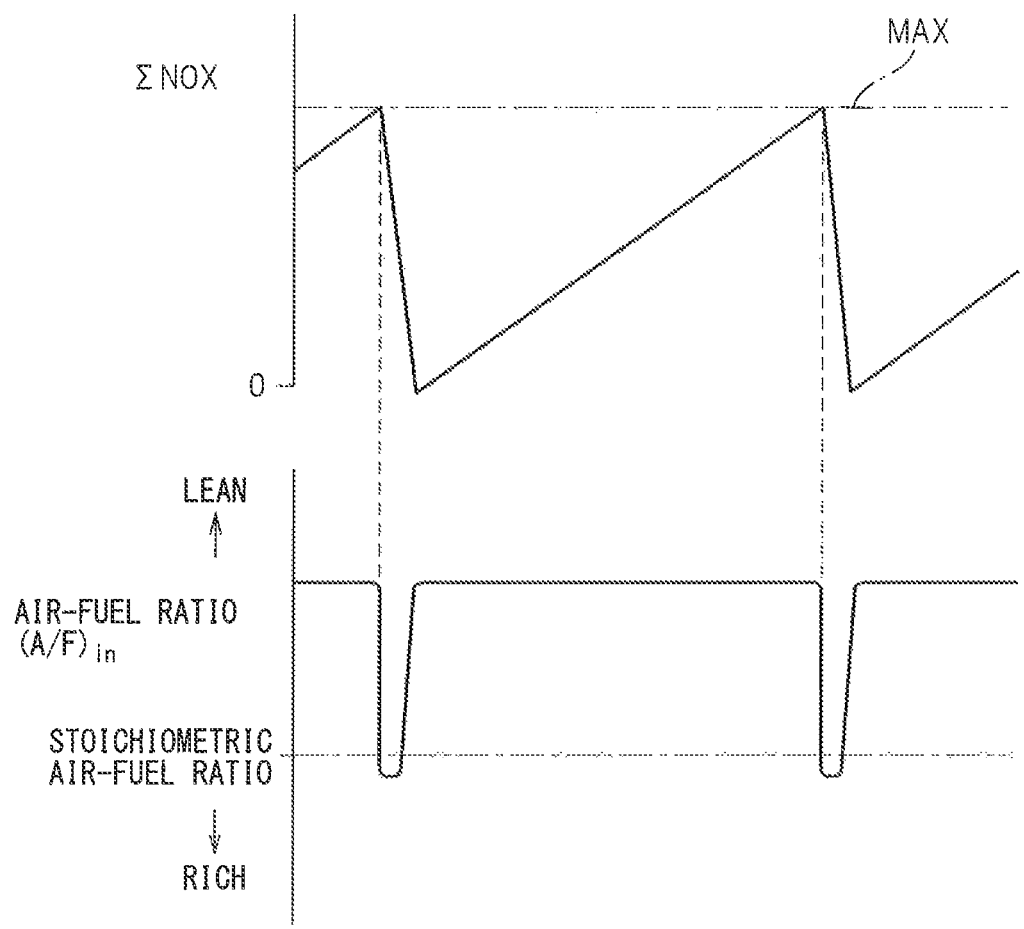
FIG. 12 is a view which shows an $NO_x$ release control.

In this second $NO_x$ removal method, as shown in FIG. 12, when the stored $NO_x$ amount $\Sigma NO_x$ of $NO_x$ which is stored in the basic layer 53 exceeds a first predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_x$ which was stored in the basic layer 53 when the air-fuel ratio (A/F) in of the exhaust gas was lean is released from the basic layer 53 all at once and reduced. Due to this, the $NO_x$ is removed.

Figure 13:
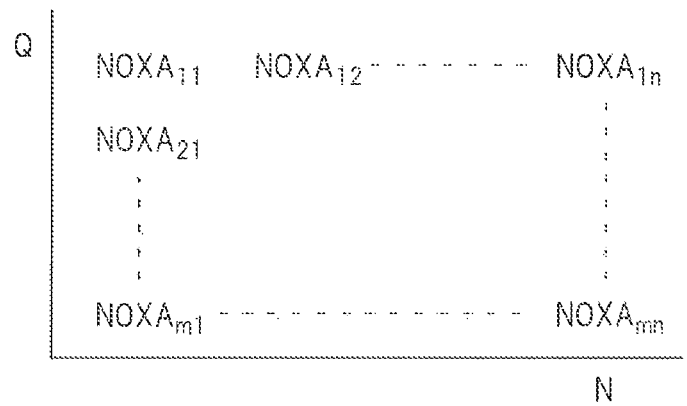
FIG. 13 is a view which shows a map of an exhausted $NO_x$ amount NOXA.

The stored $NO_x$ amount $\Sigma NO_x$ is, for example, calculated from the amount of $NO_x$ which is exhausted from the engine. In this embodiment according to the present invention, the exhausted $NO_x$ amount NOXA of $NO_x$ which is exhausted from the engine per unit time is stored as a function of the injection amount Q and engine speed N in the form of a map such as shown in FIG. 13 in advance in the ROM 32. The stored $NO_x$ amount $\Sigma NO_x$ is calculated from this exhausted $NO_x$ amount NOXA. In this case, as explained before, the period at which the air-fuel ratio (A/F) in of the exhaust gas is made rich is usually 1 minute or more.

Figure 14:
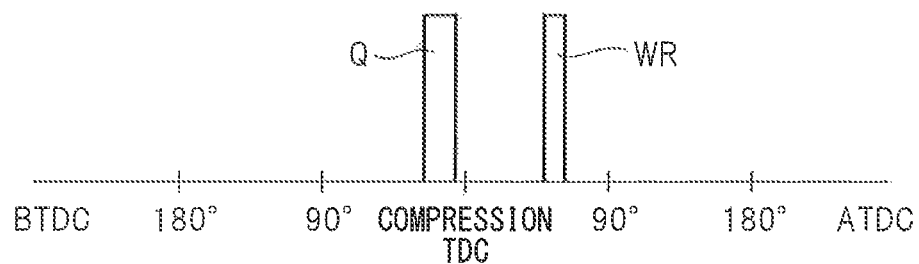
FIG. 14 is a view which shows a fuel injection timing.
Figure 15:
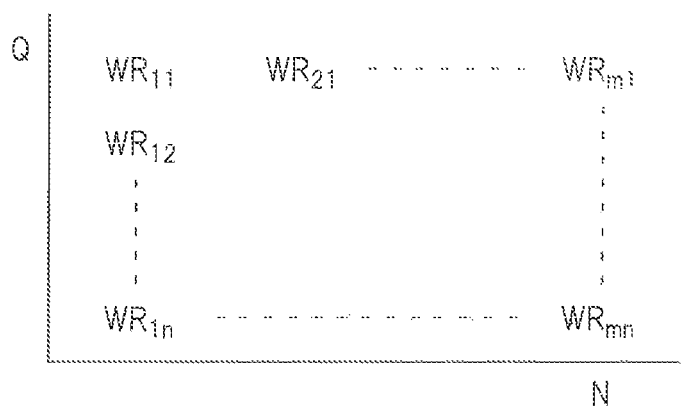
FIG. 15 is a view which shows a map of an additional hydrocarbon feed amount WR.

In this second $NO_x$ removal method, as shown in FIG. 14, by injecting an additional fuel WR into each combustion chamber 2 from the fuel injector 3 in addition to the combustion-use fuel Q, the air-fuel ratio (A/F) in of the exhaust gas which flows into the exhaust purification catalyst 13 is made rich. Note that, in FIG. 14, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 15 in advance in the ROM 32. In this way, in case where the second $NO_x$ removal method is performed, when the air-fuel ratio (A/F) in of the exhaust gas flowing into the exhaust purification catalyst 13 should be made rich, the air-fuel ratio (A/F) in of the exhaust gas discharged from the combustion chamber 2 is made rich by feeding the additional fuel WR to the combustion chamber 2.

In this case, as explained above, the additional fuel WR which is fed into the combustion chamber 2 is made to burn inside the combustion chamber 2. Therefore, inside the combustion chamber 2, at this time, rich air-fuel ratio combustion gas is generated. In the present invention, rich control which makes rich air-fuel ratio combustion gas be generated inside the cylinder and thereby makes the air-fuel ratio of the exhaust gas which flows into the exhaust purification catalyst 13 rich in this way is called "cylinder rich control". On the other hand, it is also possible to feed hydrocarbons from a hydrocarbon feed valve 15 to the exhaust gas to make the air-fuel ratio of the exhaust gas which flows into the exhaust purification catalyst 13 rich. In the present invention, rich control which feeds hydrocarbons from the hydrocarbon feed valve 15 to make the air-fuel ratio of the exhaust gas which flows into the exhaust purification catalyst 13 rich is called "exhaust rich control". In this embodiment according to the present invention, as the rich control for making the air-fuel ratio of the exhaust gas which flows into the exhaust purification catalyst 13 rich, cylinder rich control for generating rich air-fuel ratio combustion gas in the cylinder and exhaust rich control for feeding hydrocarbons from the hydrocarbon feed valve 15 to make the air-fuel ratio of the exhaust gas rich are selectively used.

Figure 16:
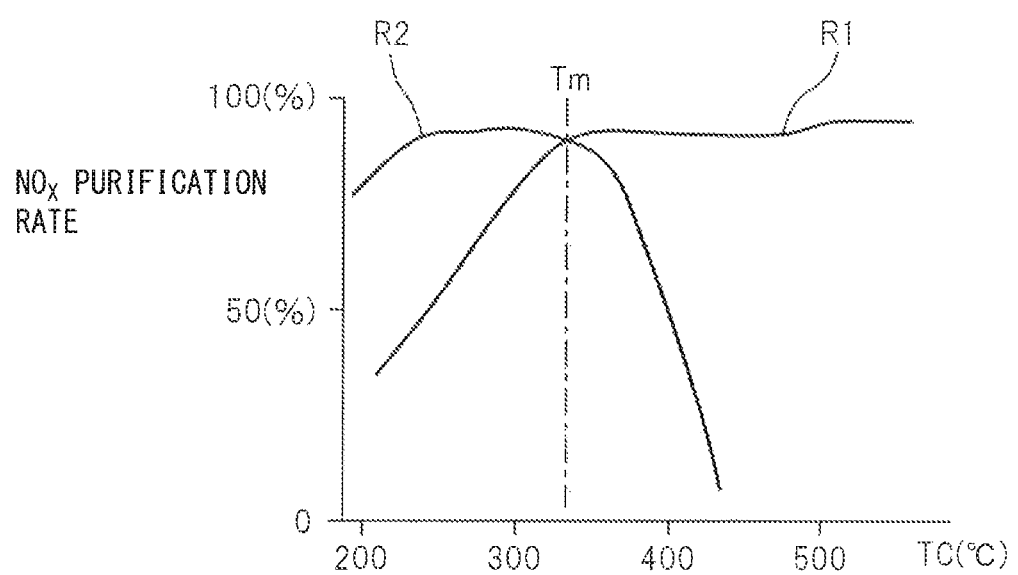
FIG. 16 is a view which shows an $NO_x$ purification rate R1 and an $NO_x$ purification rate R2.

FIG. 16 shows together the $NO_x$ purification rate R1 when an $NO_x$ removal action is performed by the first NOx removal method and an $NO_x$ purification rate R2 when an $NO_x$ removal action is performed by the second $NO_x$ removal method. Note that, in FIG. 16, Tm shows the temperature TC of the exhaust purification catalyst 13 when the $NO_x$ purification rate R1 and the $NO_x$ purification rate R2 become equal. In this embodiment according to the present invention, when the catalyst temperature TC is lower than Tm, an $NO_x$ removal action by the second $NO_x$ removal method where the higher $NO_x$ purification rate R2 is obtained is performed, while when the catalyst temperature TC is higher than Tm, an $NO_x$ removal action by the first $NO_x$ removal method where the higher $NO_x$ purification rate R1 is obtained is performed.

On the other hand, the exhaust purification catalyst 13 stores not only $NO_x$, but also the $SO_x$ which is contained in exhaust gas. In this case, if the amount of storage of $SO_x$ in the exhaust purification catalyst 13 increases, both the $NO_x$ purification rate R1 and $NO_x$ purification rate R2 fail. That is, when the $NO_x$ removal action by the first $NO_x$ removal method is performed, if the amount of storage of $SO_x$ increases, the exhaust gas flow surface parts 54 of the exhaust purification catalyst 13 weaken in basicity and can no longer generate and hold reducing intermediates well. As a result, the $NO_x$ purification rate R1 falls. On the other hand, when the $NO_x$ removal action by the second $NO_x$ removal method is performed, if the amount of storage of $SO_x$ increases, the amount of $NO_x$ which the exhaust purification catalyst 13 can store decreases. As a result, the $NO_x$ purification rate R2 fails. Therefore, both when the $NO_x$ removal action by the first $NO_x$ removal method is performed and when the $NO_x$ removal action by the second $NO_x$ removal method is performed, it is necessary to make the exhaust purification catalyst 13 release $SO_x$ when the amount of storage of $SO_x$ increases.

In this case, if raising the temperature TC of the exhaust purification catalyst 13 to the 600° C. or higher $SO_x$ release temperature and making the air-fuel ratio of the exhaust gas which flows into the exhaust purification catalyst 13 rich in a state where the temperature TC of the exhaust purification catalyst 13 is maintained at the 600° C. or higher $SO_x$ release temperature, it is possible to make the exhaust purification catalyst 13 release $SO_x$. Therefore, in this embodiment, according to the present invention, when the amount of storage of $SO_x$ which is stored in the exhaust purification catalyst 13 exceeds a predetermined allowable value SMAX, the air-fuel ratio of the exhaust gas which flows into the exhaust purification catalyst 13 is intermittently made rich to raise the temperature TC of the exhaust purification catalyst 13 to the $SO_x$ release temperature. Note that, fuel contains a certain ratio of sulfur, and accordingly it is possible to calculate the amount of storage of $SO_x$ which is stored in the exhaust purification catalyst 13 from the cumulative amount of the fuel which is fed.

Now then, as shown in FIG. 16, the first $NO_x$ removal method can obtain a high $NO_x$ purification rate even at the time of engine high load operation where the temperature of the exhaust purification catalyst 13 becomes high. Therefore, in this embodiment according to the present invention, at the time of engine high load operation, the $NO_x$ removal action by the first $NO_x$ removal method is performed. In this regard, at the time of engine high load operation, smoke is easily generated. Therefore, if the $NO_x$ removal action by the first NOx removal method is continuously performed, deposits which are comprised of carbonized particulate etc. gradually stick on the upstream side end face of the exhaust purification catalyst 13. On the other hand, at this time, if the amount of storage of $SO_x$ in the exhaust purification catalyst 13 which is calculated from the cumulative value of the fed fuel exceeds a predetermined value (allowable value SMAX), it is deemed that $SO_x$ should be released from the exhaust purification catalyst 13 and the air-fuel ratio of the exhaust gas flowing into the exhaust purification catalyst 13 is made rich to raise the temperature of the exhaust purification catalyst 13 up to the $SO_x$ release temperature.

In this case, a problem arises if making the air-fuel ratio of the exhaust gas flowing into the exhaust purification catalyst 13 rich by feeding hydrocarbons from the hydrocarbon feed valve 15. That is, when deposits build up at the upstream side end face of the exhaust purification catalyst 13, if injecting hydrocarbons from the hydrocarbon feed valve 15 to make the air-fuel ratio of the exhaust gas flowing into the exhaust, purification catalyst 13 rich, the injected hydrocarbons stick to the deposits and can no longer be burned well. As a result, the temperature of the exhaust purification catalyst 13 cannot be made to rise to the $SO_x$ release temperature and therefore the problem arises that $SO_x$ cannot be released from the exhaust purification catalyst 13 well.

Figure 17A:
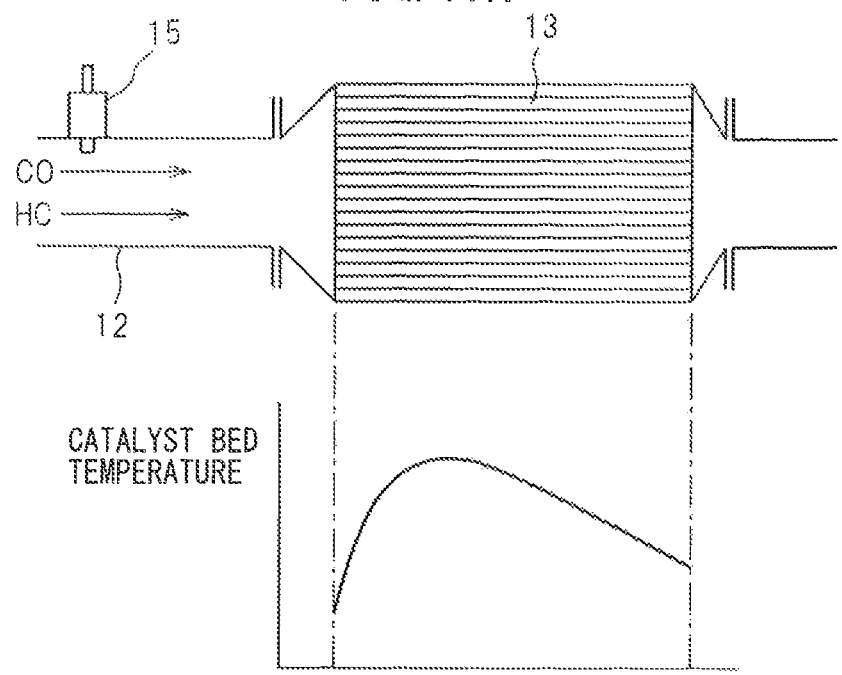
FIGS. 17A and 17B are views for explaining the temperature of the exhaust purification catalyst bed.

As opposed to this, if, at this time, performing the cylinder rich control, the temperature TC of the exhaust purification catalyst 13 can be raised to the $SO_x$ release temperature. That is, if the cylinder rich control is performed, light hydrocarbons are exhausted from the engine. The light hydrocarbons are sent to the exhaust purification catalyst 13. If, in this way, light hydrocarbons are sent into the exhaust purification catalyst 13, the deposits which built up at the upstream side end face of the exhaust purification catalyst 13 are burned off well by the light hydrocarbons, therefore, the temperature of the exhaust purification catalyst 13 rises. FIG. 17A shows the catalyst bed temperature in the exhaust purification catalyst 13 at this time. As shown in FIG. 17A, if the cylinder rich control is performed, the catalyst bed temperature at the upstream side of the exhaust purification catalyst 13 rises and the catalyst bed temperature at the upstream side of the exhaust purification catalyst 13 becomes the $SO_x$ release temperature. As a result, $SO_x$ becomes released well from the upstream side of the exhaust purification catalyst 13.

Figure 17B:
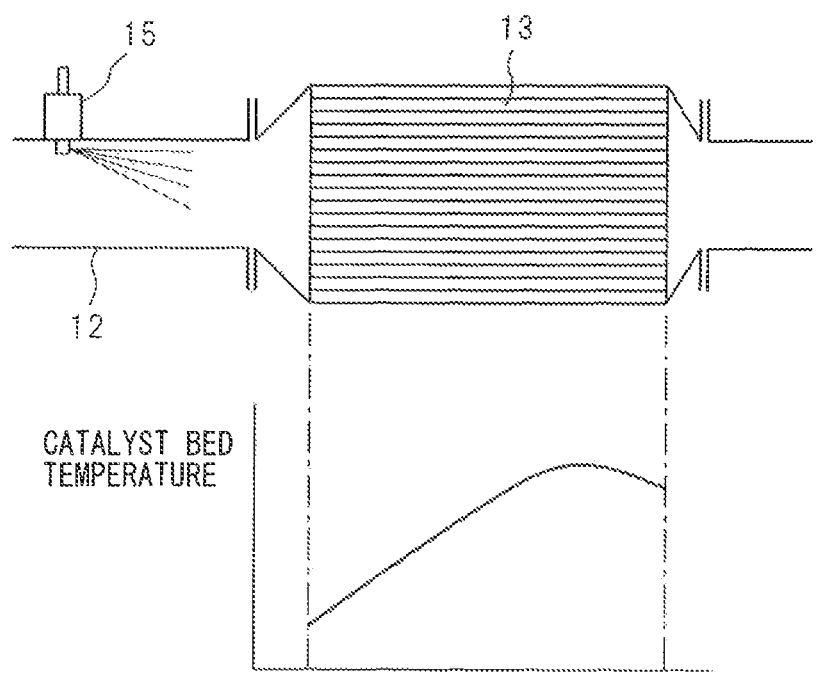

On the other hand, as shown in FIG. 17A, even if the cylinder rich control is performed, the catalyst bed temperature at the downstream side of the exhaust purification catalyst 13 will not rise to the $SO_x$ release temperature. As opposed to this, if, after the deposits which build up at the upstream side end face of the exhaust purification catalyst 13 are burned off, the air-fuel ratio of the exhaust gas flowing into the exhaust purification catalyst 13 is made rich by injecting hydrocarbons from the hydrocarbon feed valve 15, a considerable part of the hydrocarbons in the injected hydrocarbons will reach the downstream side in the exhaust purification catalyst 13 without sticking to the upstream side end face of the exhaust purification catalyst 13 and will be burned at the downstream side of the exhaust purification catalyst 13. As a result, the catalyst bed temperature at the downstream side of the exhaust purification catalyst 13 is made to rise to the $SO_x$ release temperature and, as a result, $SO_x$ is released from the downstream side of the exhaust purification catalyst 13. FIG. 17B shows the catalyst bed temperature of the exhaust purification catalyst 13 at this time. Accordingly, if the exhaust rich control is performed after the cylinder rich control is performed, it is possible to release the stored $SO_x$ from the entirety of the exhaust purification catalyst 13.

Therefore, in the present invention, in an exhaust purification system of an internal combustion engine in which an exhaust purification catalyst 13 is arranged in an engine exhaust passage, a hydrocarbon feed valve 15 is arranged in the engine exhaust passage upstream of the exhaust purification catalyst 13, precious metal catalysts 51 are carried on exhaust gas flow surfaces of the exhaust purification catalyst 13, basic exhaust gas flow surface parts 54 are formed around the precious metal catalysts 51, the exhaust purification catalyst 13 has a property of reducing $NO_x$ which is contained in the exhaust gas if making a concentration of hydrocarbons flowing into the exhaust purification catalyst 13 vibrate within a predetermined range of amplitude and within a predetermined range of period and has a property of being increased in storage amount of $NO_x$ which is contained in the exhaust gas if making a vibration period of the hydrocarbon concentration longer than the predetermined range, and $NO_x$ contained in the exhaust gas is removed by injecting hydrocarbons from the hydrocarbon feed valve 15 within said predetermined range of period, as rich control for making an air-fuel ratio of an exhaust gas flowing into the exhaust purification catalyst 13 rich, cylinder rich control for generating a rich air-fuel ratio combustion gas in a cylinder and exhaust rich control for feeding hydrocarbons from the hydrocarbon feed valve 15 to make the air-fuel ratio of the exhaust gas rich are selectively used, when $SO_x$ should be released from the exhaust purification catalyst 13, first, the cylinder rich control is performed to make the air-fuel ratio of the exhaust gas flowing into the exhaust purification catalyst 13 rich, and next the exhaust rich control is performed to make the air-fuel ratio of the exhaust gas flowing into the exhaust purification catalyst 13 rich.

In this case, in this embodiment according to the present invention, the cylinder rich control is performed to make the air-fuel ratio of the exhaust gas flowing into the exhaust purification catalyst 13 rich until the action of release of $SO_x$ which is stored at an upstream side of the exhaust purification catalyst 13 is completed, and when the action of release of $SO_x$ which is stored at the upstream side of the exhaust purification catalyst 13 is completed, the exhaust rich control is performed to make the air-fuel ratio of the exhaust gas flowing into the exhaust purification catalyst 13 rich to release $SO_x$ which is stored at a downstream side of the exhaust purification catalyst 13.

Figure 18:
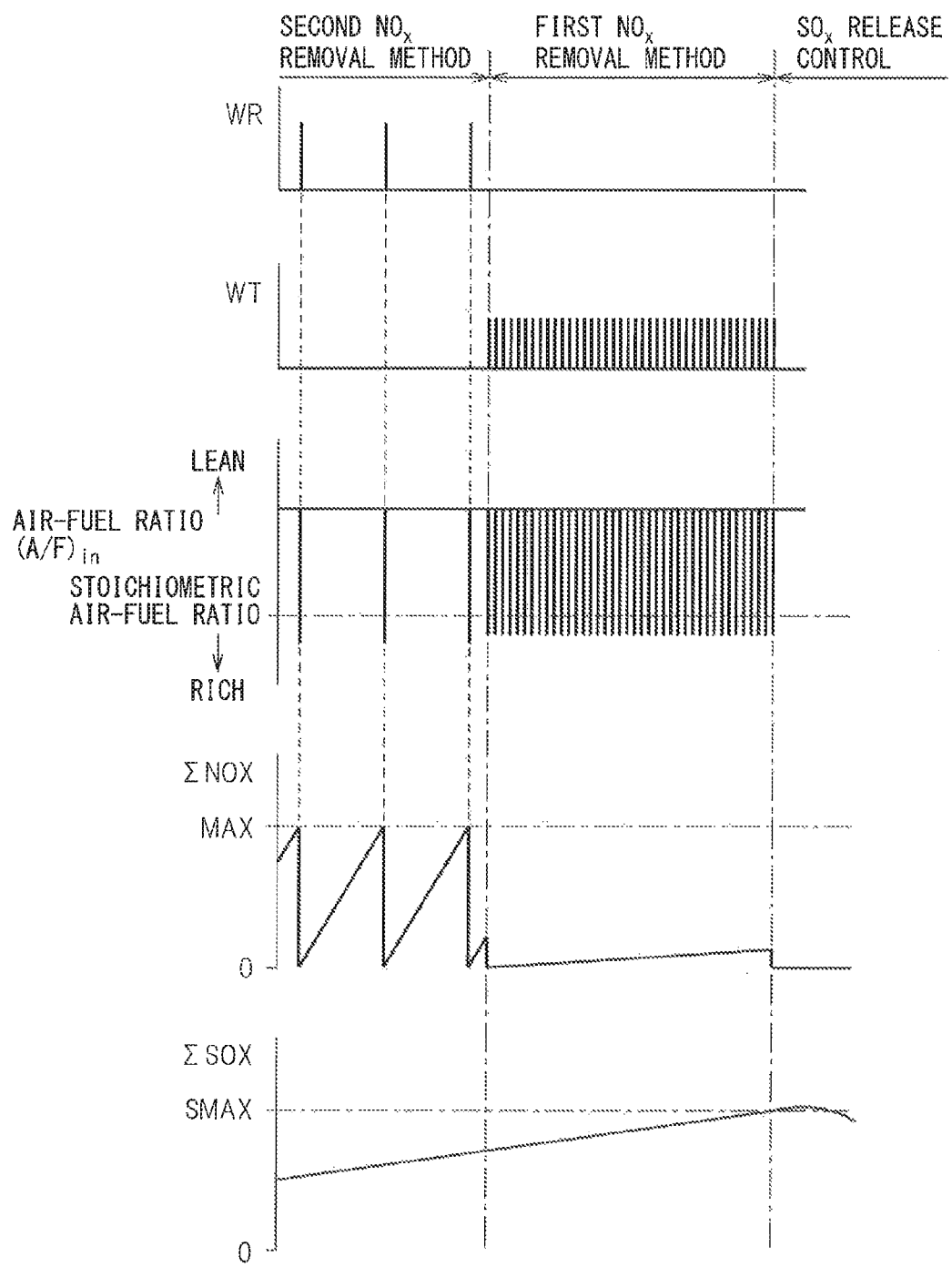
FIG. 18 is a time chart which shows an $NO_x$ purification control.

FIG. 18 shows a time chart of $NO_x$ purification control. Note that, in FIG. 18, an additional fuel amount WR from the fuel injector 3, a hydrocarbon amount WT from the hydrocarbon feed valve 15, a change in the air-fuel ratio (A/F) in of the exhaust gas flowing into the exhaust purification catalyst 13, a change in the $NO_x$ storage amount ΣNOX in the exhaust purification catalyst 13, and a change in the $SO_x$ storage amount ΣSOX in the exhaust purification catalyst 13 are shown. Further, in FIG. 18, an allowable value MAX for the stored $NO_x$ amount and an allowable value SMAX for the stored $SO_x$ amount are shown.

As explained above, if the temperature TC of the exhaust purification catalyst 13 exceeds the Tm shown in FIG. 16, the $NO_x$ removal action is switched to the $NO_x$ removal action by the first $NO_x$ removal method from the $NO_x$ removal action by the second $NO_x$ removal method. As will be understood from FIG. 18, when the $NO_x$ removal action by the second $NO_x$ removal method is being performed, if the stored $NO_x$ amount ΣNOX exceeds the allowable value MAX, the cylinder rich control is performed to make the air-fuel ratio (A/F) in of the exhaust gas flowing into the exhaust purification catalyst 13 rich, while when the $NO_x$ removal action by the first $NO_x$ removal method is being performed, hydrocarbons are periodically injected from the hydrocarbon feed valve 15 to periodically make the air-fuel ratio (A/F) in of the exhaust gas flowing into the exhaust purification catalyst 13 rich. Further, FIG. 18 shows the case where when the $NO_x$ removal action by the first $NO_x$ removal method is being performed, the stored $SO_x$ amount ΣSOX exceeds the allowable value SMAX and thereby $SO_x$ release control is started. A time chart when this $SO_x$ release control is being performed is shown in FIG. 19.

Figure 19:
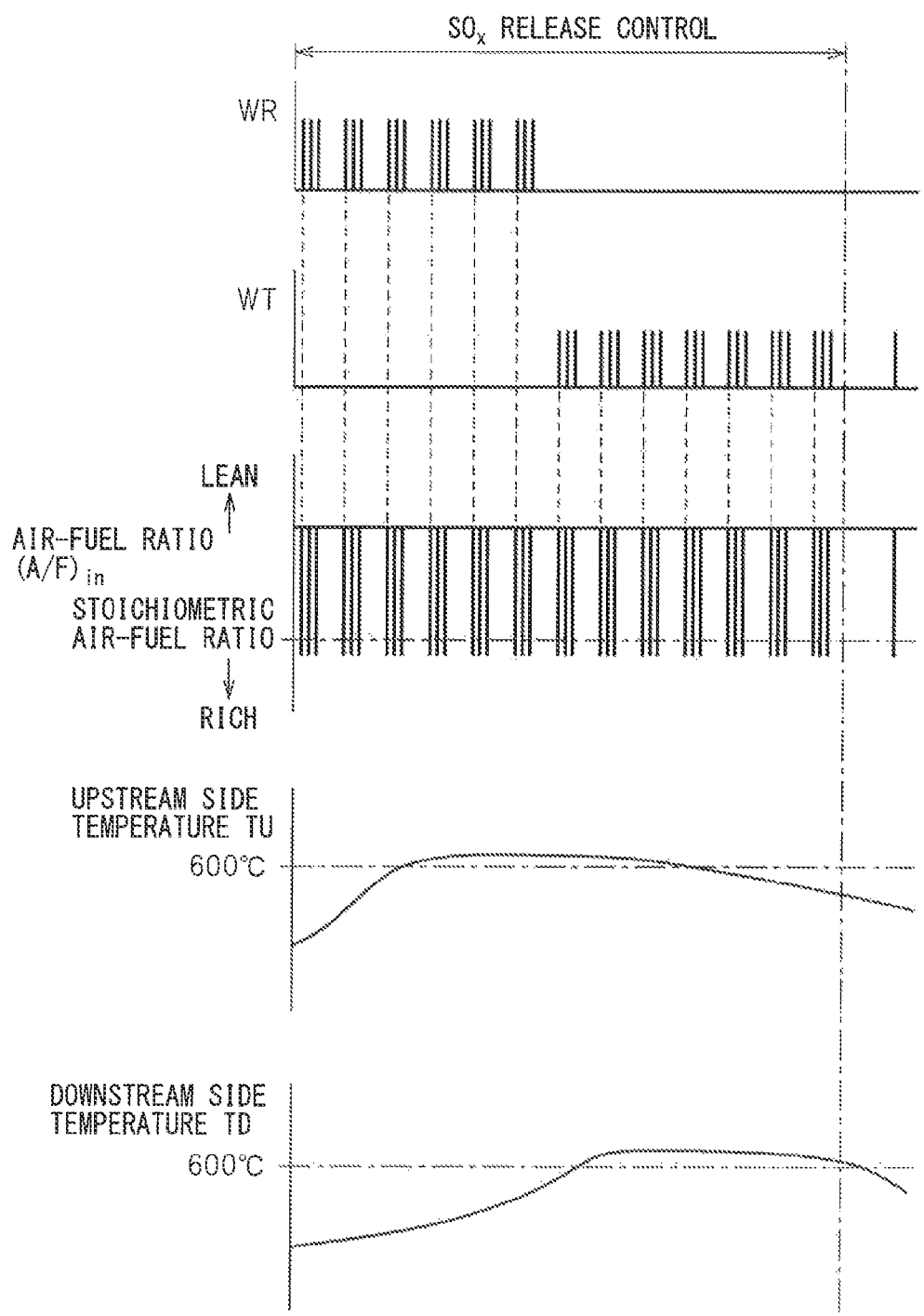
FIG. 19 is a time chart which shows an $SO_x$ purification control.

Referring to FIG. 19, in FIG. 19, an additional fuel amount WR from the fuel injector 3, a hydrocarbon amount WT from the hydrocarbon feed valve 15, a change in the air-fuel ratio (A/F) in of the exhaust gas flowing into the exhaust purification catalyst 13, an upstream side temperature TU of the exhaust purification catalyst 13, and a downstream side temperature TD of the exhaust purification catalyst 13 are shown. As shown in FIG. 19, if $SO_x$ release control is started, the cylinder rich control is intermittently performed. Due to this, the upstream side temperature TU of the exhaust purification catalyst 13 is made to rise to the $SO_x$ release temperature. Next, the exhaust rich control is intermittently performed. Due to this, the downstream side temperature TD of the exhaust purification catalyst 13 is made to rise to the $SO_x$ release temperature.

Figure 20:
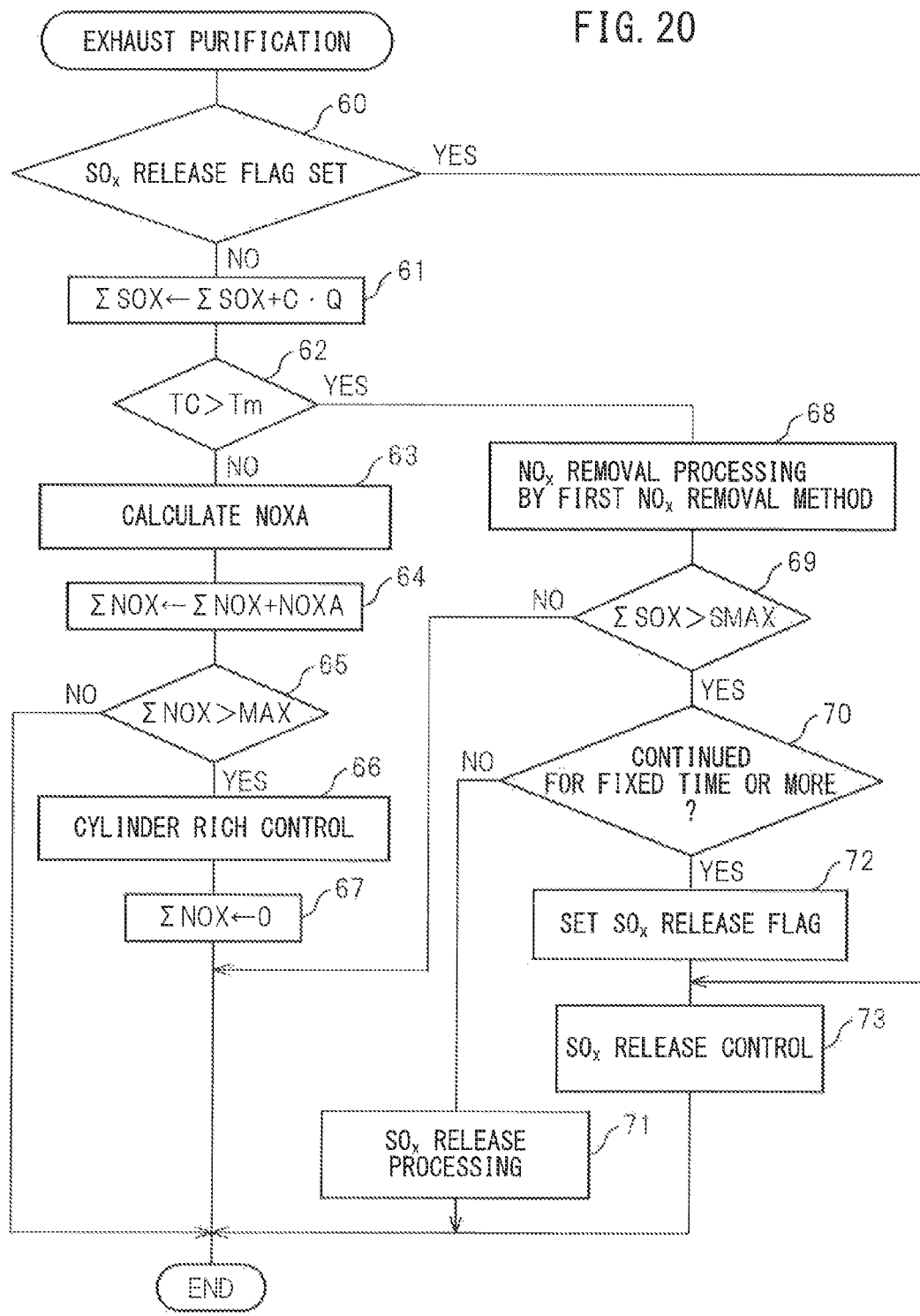
FIG. 20 is a flow chart for performing an $NO_x$ purification.

FIG. 20 shows an exhaust purification control routine which is executed by the electronic control unit 30. This routine is executed by interruption every fixed time period. Referring to FIG. 20, first, at step 60, it is judged if the $SO_x$ release flag showing that $SO_x$ should be released is set. If the $SO_x$ release flag showing that $SO_x$ should be released is not set, the routine proceeds to step 61 where the fuel injection amount Q multiplied with a constant value C is added to ΣSOX to thereby calculate the stored $NO_x$ amount ΣNOX which is stored in the exhaust purification catalyst 13. Next, at step 62, it is judged if the temperature TC of the exhaust purification catalyst 13 which is calculated based on the detected values of the temperature sensors 23 and 24 is higher than the catalyst temperature Tm which is shown in FIG. 16. When the catalyst temperature TC is lower than the temperature Tm, it is judged that the $NO_x$ removal action by the second $NO_x$ removal method should be performed, then the routine proceeds to step 63 where the $NO_x$ removal action by the second $NO_x$ removal method is performed.

That is, at step 63, the $NO_x$ amount NOXA which is exhausted per unit time is calculated from the map which is shown in FIG. 13. Next, at step 64, the exhausted $NO_x$ amount NOXA is added to the ΣNOX to calculate the stored $NO_x$ amount ΣNOX. Next, at step 65, it is judged if the stored $NO_x$ amount ΣNOX exceeds the allowable value MAX. When ΣNOX>MAX, the routine proceeds to step 66 where the additional fuel amount WR is calculated from the map which is shown in FIG. 15, next at step 66, an additional fuel injection action is performed. That is, the cylinder rich control is performed. At this time, the $NO_x$ which is stored in the exhaust purification catalyst 13 is released. Next, at step 67, ΣNOX is cleared.

On the other hand, when, at step 62, it is judged that the calculated catalyst temperature TC is higher than the catalyst temperature Tm which is shown in FIG. 16, it is judged that the $NO_x$ removal action by the first $NO_x$ removal method should be performed, then the routine proceeds to step 68 where the $NO_x$ removal action by the first $NO_x$ removal method is performed. That is, the hydrocarbon injection amount WT is calculated from FIG. 11A, the hydrocarbon injection period ΔT is calculated from FIG. 11B, and hydrocarbons are injected from the hydrocarbon feed valve 15 based on the calculated injection period ΔT and injection amount WT. Next, at step 69, it is judged if the stored $SO_x$ amount ΣSOX exceeds the allowable value SMAX. When the stored $SO_x$ amount ΣSOX does not exceed the allowable value SMAX, the processing cycle is ended.

As opposed to this, when, at step 69, it is judged that the stored $SO_x$ amount ΣSOX exceeds the allowable value SMAX, the routine proceeds to step 70 where it is judged if the $NO_x$ removal action by the first $NO_x$ removal method has continued for a predetermined fixed time or more. When the $NO_x$ removal action by the first $NO_x$ removal method has not continued for the predetermined fixed time or more, it is judged that deposits have not built up on the upstream side end face of the exhaust purification catalyst 13. In this case, the routine proceeds to step 71 where the conventionally performed $SO_x$ release treatment is performed. For example, at this time, hydrocarbons are intermittently injected from the hydrocarbon feed valve 15, that is, the exhaust rich control is intermittently performed to perform $SO_x$ release processing.

On the other hand, when it is judged at step 70 that the $NO_x$ removal action by the first $NO_x$ removal method has continued for the predetermined fixed time or more, it is judged that deposits have built up on the upstream side end face of the exhaust purification catalyst 13. At this time, the routine proceeds to step 72 where the $SO_x$ release flag is set, then the routine proceeds to step 73 where $SO_x$ release control according to the present invention is performed. Once the $SO_x$ release flag is set, at the next processing cycle, the routine jumps from step 60 to step 73. The $SO_x$ release control which is performed at step 73 is shown in FIG. 21.

Figure 22A:
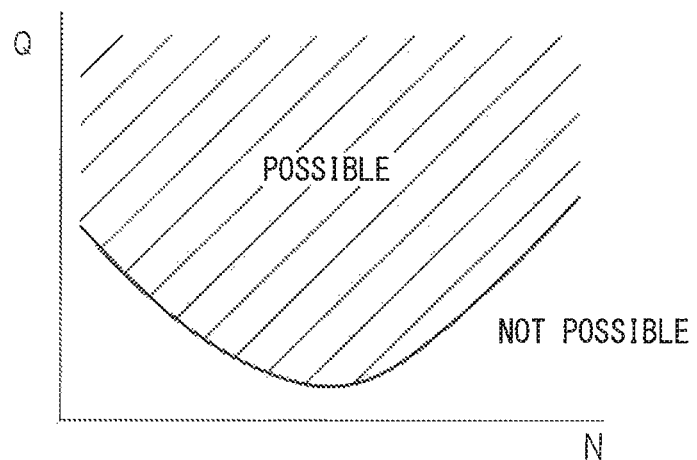
FIGS. 22A and 22B are views which show engine operation regions in which a cylinder rich control and an exhaust rich control can be performed respectively.

Referring to FIG. 21, first, at step 80, it is judged if the upstream side completion flag showing that the $SO_x$ release action from the upstream side of the exhaust purification catalyst 13 has been completed is set. When $SO_x$ release control is started, the upstream side completion flag is not set, so the routine proceeds to step 81 where it is judged if the catalyst temperature TC is higher than the activation temperature T1 at which reaction is possible for the cylinder rich control, for example, 150° C. or more. When the catalyst temperature TC is higher than the activation temperature T1, the routine proceeds to step 82 where it is judged if the operating state of the engine is an operating region where the cylinder rich control is possible. At this time, the operating region where the cylinder rich control is possible is shown by the hatching in FIG. 22A. As shown in FIG. 22A, this operating region where the cylinder rich control is possible is determined from the fuel injection amount Q and the engine speed N.

When it is judged at step 82 that the operating state of the engine is in an operating region where the cylinder rich control is possible, the routine proceeds to step 83 where the cylinder rich control which is shown in FIG. 19 is performed. Next, at step 84, it is judged if the action of release of $SO_x$ from the upstream side of the exhaust purification catalyst 13 has been completed, for example, if the cylinder rich control has been performed continuously for a predetermined time. When it is judged that the action of release of $SO_x$ from the upstream side of the exhaust purification catalyst 13 is completed, that is, when regeneration of the upstream side of the exhaust purification catalyst 13 is completed, the routine proceeds to step 85 where the upstream side completion flag is set. Once the upstream side completion flag is set, at the next processing cycle, the routine proceeds from step 80 to step 86.

Figure 22B:
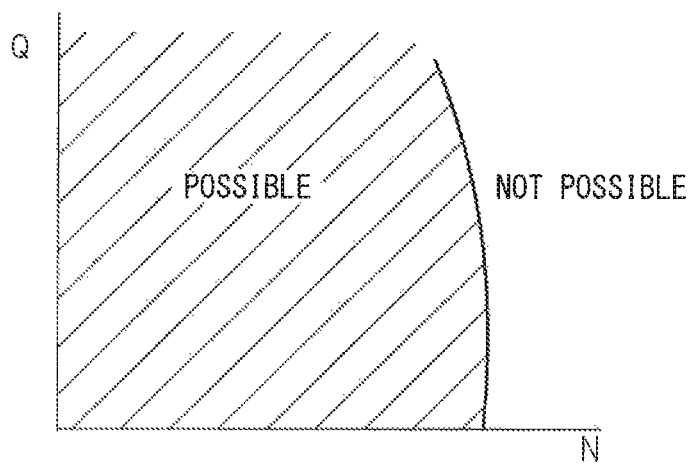

At step 86, it is judged if the catalyst temperature TC is higher than the activation temperature T2 at which reaction is possible for the exhaust rich control, for example, 200° C. or more. When the catalyst temperature TC is higher than the activation temperature T2, the routine proceeds to step 87 where it is judged if the operating state of the engine is an operating range where the exhaust rich control is possible. The operating region in which the exhaust rich control is possible at this time is shown by the hatching in FIG. 22B. As shown in FIG. 22B, the operating region where this exhaust rich control is possible is determined from the fuel injection amount Q and the engine speed N.

When it is judged at step 87 that the operating state of the engine is in an operating region where exhaust rich control is possible, the routine proceeds to step 88 where the exhaust rich control which is shown in FIG. 19 is performed. Next, at step 89, it is judged if the $SO_x$ release action from the downstream side of the exhaust purification catalyst 13 has been completed, for example, if exhaust rich control has been performed continuously for a predetermined time. When it is judged that the $SO_x$ release action from the downstream side of the exhaust purification catalyst 13 has been completed, that is, when the regeneration of the downstream side of the exhaust purification catalyst 13 has been completed, the routine proceeds to step 90 where the upstream side completion flag is reset. Next, at step 91, the $SO_x$ release flag is reset, next at step 92, ΣSOX is cleared.

In the above example, when the cylinder rich control has been performed continuously for a predetermined time, it is judged that the $SO_x$ release action from the upstream side of the exhaust purification catalyst. 13 has been completed. At this time, the cylinder rich control is made to end and the $SO_x$ release action from the upstream side of the exhaust purification catalyst 13 is made to end. Further, in this example, when the exhaust rich control is performed continuously for a predetermined time, it is judged that the $SO_x$ release action from the downstream side of the exhaust purification catalyst 13 has been completed. At this time, the exhaust rich control is made to end and the $SO_x$ release action from the downstream side of the exhaust purification catalyst 13 is made to end. In this case, in another embodiment, when the stored $SO_x$ amount $\Sigma SOX$ becomes less than the first predetermined value, the $SO_x$ release action from the upstream side of the exhaust purification catalyst 13 can be made to end, while when the stored $SO_x$ amount $\Sigma SOX$ becomes less than the second predetermined value, the $SO_x$ release action from the downstream side of the exhaust purification catalyst 13 can be made to end. Further, in still another embodiment, the upstream, side stored $SO_x$ amount of the upstream side of the exhaust purification catalyst 13 and the downstream side stored $SO_x$ amount of the downstream side of the exhaust purification catalyst 13 are individually calculated, and when the upstream side stored $SO_x$ amount falls below a predetermined value, the $SO_x$ release action from the upstream side of the exhaust purification catalyst 13 is made to end, while when the downstream side stored $SO_x$ amount falls below a predetermined value, the $SO_x$ release action from the downstream side of the exhaust, purification catalyst 13 is made to end.

As will be understood from the $SO_x$ release control routine which is shown in FIG. 21, in this embodiment according to the present invention, the temperature range of the exhaust purification catalyst 13 and the operating region of the engine where the cylinder rich control can be performed are predetermined. When the cylinder rich control is to be performed, the cylinder rich control is performed when the temperature TC of the exhaust purification catalyst 13 and the operating state of the engine are respectively in the predetermined temperature range of the exhaust purification catalyst 13 (TC>T1) and operating region of the engine (FIG. 22A) where the cylinder rich control can be performed. Furthermore, in this embodiment according to the present invention, the temperature range of the exhaust purification catalyst 13 and the operating region of the engine where the exhaust rich control can be performed are predetermined. When the exhaust rich control is to be performed, the exhaust rich control is performed when the temperature TC of the exhaust purification catalyst 13 and the operating state of the engine are respectively in the predetermined temperature range of the exhaust purification catalyst 13 (TC>T1) and operating region of the engine (FIG. 22B) where the exhaust rich control can be performed.

Further, in this embodiment according to the present invention, in addition to the first $NO_x$ removal method which removes $NO_x$ contained in the exhaust gas by injecting hydrocarbons from the hydrocarbon feed valve 15 at a period within the predetermined range, the second $NO_x$ removal method which makes the air-fuel ratio of the exhaust gas flowing into the exhaust purification catalyst 13 rich to release a stored $NO_x$ from the exhaust purification catalyst 13 when an amount of $NO_x$ stored in the exhaust purification catalyst 13 exceeds a predetermined allowable value is used. An $NO_x$ removal action by the first $NO_x$ removal method is performed when the temperature of the exhaust purification catalyst 13 is higher than the predetermined temperature Tm, while an $NO_x$ removal action by the second $NO_x$ removal method is performed when the temperature of the exhaust purification catalyst 13 is lower than the predetermined setting temperature Tm. Furthermore, as will be understood from the $SO_x$ release control routine which is shown in FIG. 21, when $SO_x$ should be released from the exhaust purification catalyst 13, if the NOX removal action by the first NOx removal method continues for a predetermined time or more, first, the cylinder rich control is performed, and then the exhaust rich control is performed to release $SO_x$ from the exhaust purification catalyst 13.

Note that, as another embodiment, it is also possible to arrange an oxidation catalyst for reforming the hydrocarbons in the engine exhaust passage upstream of the exhaust purification catalyst 13.

REFERENCE SIGNS LIST

4. intake manifold
5. exhaust manifold
7. exhaust turbocharger
12. exhaust pipe
13. exhaust purification catalyst
14. particulate filter
15. hydrocarbon feed valve

The invention claimed is:

1. An exhaust purification system of an internal combustion engine, comprising;
   an exhaust purification catalyst arranged in an engine exhaust passage;
   a hydrocarbon feed valve arranged in the engine exhaust passage upstream of the exhaust purification catalyst;
   precious metal catalysts carried on exhaust gas flow surfaces of the exhaust purification catalyst;
   basic exhaust gas flow surface parts formed around the precious metal catalysts, wherein the exhaust purification catalyst is configured to:
      reduce $NO_x$ contained in the exhaust gas when a concentration of hydrocarbons flowing into the exhaust purification catalyst vibrates within a predetermined range of amplitude and within a predetermined range of period and;
      be increased in a storage amount of $NO_x$ when a vibration period of the hydrocarbon concentration is longer than the predetermined range, wherein NOx contained in the exhaust gas is removed when hydrocarbons from the hydrocarbon feed valve are injected within said predetermined range of period; and
   a control unit configured to execute a rich control for making an air-fuel ratio of an exhaust gas flowing into the exhaust purification catalyst rich, wherein:
      the rich control includes a cylinder rich control for generating a rich air-fuel ratio combustion gas in a cylinder and an exhaust rich control for feeding hydrocarbons from the hydrocarbon feed valve to make the air-fuel ratio of the exhaust gas rich; and
      the control unit is configured to selectively execute, when SOx should be released from the exhaust purification catalyst, first, the cylinder rich control to make the air-fuel ratio of the exhaust gas flowing into the exhaust purification catalyst rich and thereby burn off deposits which build up at an upstream side end face of the exhaust purification catalyst, and next the exhaust rich control to make the air-fuel ratio of the exhaust gas flowing into the exhaust purification catalyst rich.

2. The exhaust purification system of an internal combustion engine as claimed in claim 1, wherein the control unit is configured to execute the cylinder rich control to make the air-fuel ratio of the exhaust gas flowing into the exhaust purification catalyst rich until the action of release of $SO_x$ which is stored at an upstream side of the exhaust purification catalyst is completed, and when the action of release of $SO_x$ which is stored at the upstream side of the exhaust purification catalyst is completed, execute the exhaust rich control to make the air-fuel ratio of the exhaust gas flowing into the exhaust purification catalyst rich to release $SO_x$ which is stored at a downstream side of the exhaust purification catalyst.

3. The exhaust purification system of an internal combustion engine as claimed in claim 1, wherein the control unit is configured to execute the cylinder rich control when a temperature of the exhaust purification catalyst and an operating state of the engine are respectively in a predetermined temperature range of the exhaust purification catalyst and a predetermined operating region of the engine where the cylinder rich control can be performed.

4. The exhaust purification system of an internal combustion engine as claimed in claim 1, wherein the control unit is configured to execute the exhaust rich control when a temperature of the exhaust purification catalyst and an operating state of the engine are respectively in a predetermined temperature range of the exhaust purification catalyst and a predetermined operating region of the engine where the exhaust rich control can be performed.

5. The exhaust purification system of an internal combustion engine as claimed in claim 1, wherein the control unit is configured to execute, when $SO_x$ should be released from the exhaust purification catalyst:

a first $NO_x$ removal method which removes $NO_x$ contained in the exhaust gas by injecting hydrocarbons from the hydrocarbon feed valve at a period within said predetermined range when a temperature of the exhaust purification catalyst is higher than a predetermined temperature; and a second $NO_x$ removal method which makes the air-fuel ratio of the exhaust gas flowing into the exhaust purification catalyst rich to release a stored $NO_x$ from the exhaust purification catalyst when an amount of $NO_x$ stored in the exhaust purification catalyst exceeds a predetermined allowable value when the temperature of the exhaust purification catalyst is lower than the predetermined setting temperature; and wherein when the $NO_x$ removal action by the first $NO_x$ removal method continues for a predetermined time or more, the control unit is configured to first execute the cylinder rich control and then execute the exhaust rich control to release $SO_x$ from the exhaust purification catalyst.

6. The exhaust purification system of an internal combustion engine as claimed in claim 1, wherein the control unit is configured to execute, when $SO_x$ should be released from the exhaust purification catalyst, first, the cylinder rich control to make the air-fuel ratio of the exhaust gas flowing into the exhaust purification catalyst rich and thereby release $SO_x$ stored in an upstream side of the exhaust purification catalyst, and next the exhaust rich control to make the air-fuel ratio of the exhaust gas flowing into the exhaust purification catalyst rich and thereby release $SO_x$ stored in a downstream side of the exhaust purification catalyst.

* * * * *